United States Patent [19]

Lee et al.

[11] Patent Number: 5,577,059
[45] Date of Patent: Nov. 19, 1996

[54] SECOND HARMONIC GENERATION METHOD AND APPARATUS

[75] Inventors: Hang-woo Lee, Kunpo; Sang-hak Lee, Seoul; Joseph K. Chee, Songtan; Young-mo Hwang, Seoul, all of Rep. of Korea; Yurij V. Tsvetkov, Moscow, Russian Federation; Alexander V. Semenenko, Moscow, Russian Federation; Ivan I. Kuratev, Moscow, Russian Federation

[73] Assignee: Samsung Electronics Co., Ltd., Kyungki-do, Rep. of Korea

[21] Appl. No.: 520,391

[22] Filed: Aug. 29, 1995

[30] Foreign Application Priority Data

May 9, 1995 [KR] Rep. of Korea ............... 95-11291

[51] Int. Cl.⁶ ................................................ H01S 3/10
[52] U.S. Cl. .................... 372/22; 372/34; 359/328
[58] Field of Search ................ 372/22, 34; 359/328

[56] References Cited

U.S. PATENT DOCUMENTS

| | | |
|---|---|---|
| 3,858,056 | 12/1974 | Melamed et al. ............... 372/34 |
| 4,181,899 | 1/1980 | Liu ................................ 372/34 |
| 4,413,342 | 11/1983 | Cohen et al. . |
| 4,809,291 | 2/1989 | Byer et al. ..................... 372/34 |
| 5,093,832 | 3/1992 | Bethune et al. ............... 372/34 |
| 5,287,367 | 2/1994 | Yanagawa ..................... 372/34 |
| 5,383,209 | 1/1995 | Hwang .......................... 372/34 |

*Primary Examiner*—Rodney B. Bovernick
*Assistant Examiner*—Robert E. Wise
*Attorney, Agent, or Firm*—Rothwell, Figg, Ernst & Kurz

[57] ABSTRACT

A second harmonic generation method and apparatus is capable of stabilizing an output. The apparatus provides a first beam splitter on the proceeding path of a second harmonic output, and other beam splitters on the proceeding path of the reflecting beam of the second harmonic and that of the transmitted beam. A second and third beam splitters are arranged on the proceeding paths of the second harmonic output and the beam separated from the second harmonic output to satisfy $$K = \frac{(1-R_\parallel)(1-R_\perp)}{R_\parallel R_\perp}$$

where $K$ is a constant, $R_\parallel$ is reflectivity with respect to p-polarization parallel to the incident surface of the first and second beam splitter, and $R_\perp$ is reflectivity with respect to s-polarization perpendicular to the incident surface of the first and second beam splitters.

3 Claims, 5 Drawing Sheets

SECOND HARMONIC GENERATION METHOD AND APPARATUS

BACKGROUND OF THE INVENTION

The present invention relates to a second harmonic generation method and apparatus, and more particularly, to a second harmonic generation method and apparatus capable of stabilizing an output.

In a recording/reproducing system used in an audio/video system such as a laser disk player, and an information recording device such as an optical magnetic drive, a laser having a linearly polarized stable output is required. Generally, the amplitude of an output laser beam can be stabilized easily by adjusting the input current of the laser diode, a light source, by the feedback control structure of the laser output. The output of an optical amplifying solid state laser system can be stabilized by controlling the laser output and amplification ratio. The laser device including an harmonic generating process by a non-linear birefringent crystalline material needs a complex feedback control structure.

A second harmonic generator using a pumping laser diode emitting blue-green light is a very useful light source for high-density optical magnetic recording. The second harmonic generation device in which a frequency doubling non-linear birefringent crystalline material is provided inside an internal resonator, is one laser device having the characteristic that the amplitude of the output laser is unstable. Accordingly, much research into second harmonic generating methods and the stabilization of the second harmonic output are underway.

Phase matching is a prerequisite for the effective and stable generation of the second harmonic.

Technology capable of realizing effective second harmonic generation with a low output was proposed in U.S. Pat Nos. 4,413,342 and 5,093,832. The former proposed a frequency doubling method of the internal resonator type. The laser resonator includes one pair of mirrors on which a coating layer of high reflectivity with respect to a fundamental wave is provided. In this method, an effective second harmonic generation can be realized with least loss by providing a non-linear birefringent crystalline material for frequency doubling inside the resonator to which a fundamental wave is injected at high strength. In the latter patent (U.S. Pat. No. 5,093,832), resonance occurs inside the frequency doubling birefringent crystalline structure, and second harmonic generation can be effectively realized by reinforcement of the fundamental wave in a resonator having such a structure. Here, a stable second harmonic was achieved by controlling the temperature of the frequency doubling non-linear birefringent crystalline material through the feedback control loop of the second harmonic.

Another temperature control method is shown in U.S. Pat. No. 3,858,056. In this method, the output of the laser separated by a beam splitter can be measured with a photo detector placed in the feedback control loop. In such a structure, although the second harmonic output has a maximum value at the correct temperature, an error signal is generated. Also, the error signal does not indicate which direction to adjust the temperature of the non-linear birefringent crystalline material. Accordingly, such a temperature control method is difficult to be apply because of the ambiguity of the error signal. Further, the error signal generated from the second harmonic divided by the beam splitter is not sensitive to the polarization change of the second harmonic, which is another problem of this method.

That is, since the beam splitter has different reflectivities with respect to s-polarization and p-polarization, although the feedback circuit operates properly, it is difficult to stabilize the output of the second harmonic when the polarization change of the second harmonic is generated.

In any laser system in which the polarization state is one parameter, temperature control for stabilizing the output is required to be executed regardless of the polarization state of the second harmonic.

SUMMARY OF THE INVENTION

It is an object of the present invention to provide a second harmonic generation method and apparatus capable of stabilizing an output effectively.

To accomplish the above object, there is provided a second harmonic generation method comprising the steps of: generating a fundamental wave and a second harmonic thereof inside an optical resonator; and feeding back part of an output of the second harmonic so as to control the temperature of the generation source of the second harmonic;

wherein a second and third beam splitter are arranged in the proceeding path of a beam separated into the proceeding path of a second harmonic output and that of the output of the second harmonic to satisfy the following equation.

$$K = \frac{(1 - R_\parallel)(1 - R_\perp)}{R_\parallel R_\perp}$$

where K is a constant, $R_\parallel$ is reflectivity with respect to p-polarization parallel to the incident surface of a first and second beam splitter, and $R_\perp$ is reflectivity with respect to s-polarization perpendicular to the incident surface of the first and second beam splitter.

Also, to accomplish the above object, there is provided a second harmonic generation apparatus including: a resonator providing an input mirror and an output mirror; a non-linear birefringent crystalline element and a gain medium provided on the optical axis placed inside the resonator; a temperature control device controlling the temperature of the non-linear birefringent crystalline element; a first beam splitter provided on the proceeding path of the second harmonic passing through the output mirror; an optical detector provided on the proceeding path of a reflected beam of the second harmonic reflected by the beam splitter; a second beam splitter provided in between the optical detector and the first beam splitter; a third beam splitter provided on the proceeding path of the transmitted beam from the first beam splitter; and a control circuit controlling a temperature control device by a signal emitted from the optical detector.

In the second harmonic generation apparatus of the present invention, it is necessary that the second beam splitter and the third beam splitter have an incline angle of 45° with respect to the optical axis of the reflecting beam reflected by the first beam splitter and with that of the transmitted beam from first beam splitter, and are perpendicular to the incident surface of the first beam splitter.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In a second harmonic generation method of the present invention, a birefringent crystalline gain medium such as a Nd:YAG, which is one kind of a solid state laser pumped by a laser diode, is provided on a laser generation optical axis located inside a resonator composed of two mirrors having a high reflectivity with respect to a fundamental wave. The fundamental wave is achieved by exciting the birefringent crystalline gain medium with the pumping laser firing into the resonator. A second harmonic is achieved from the fundamental wave by locating the non-linear birefringent crystalline material on the optical axis. An polarization element such as a Brewster plate converting the fundamental wave into linearly polarized light is located in between the gain medium and the non-linear birefringent crystalline material. The non-linear birefringent crystalline element for frequency doubling is type II phase-matched, the temperature of the non-linear birefringent crystalline element is controlled by a thermoelectric cooling element using the a Peltier effect. The output of the second harmonic has a polarization component close to the extra-ordinary axis of the frequency doubling non-linear birefringent crystalline element. According to actual experiment, it was confirmed that the polarization of the second harmonic was not linearly polarized precisely, because the polarization nature disappeared when the polarized light passed through the frequency doubling non-linear birefringent crystalline element. Also it was confirmed that the degree of disappearance of polarization differed according to the temperature.

Type I and II phase matching conditions are explained as follow.

Figure 1A:
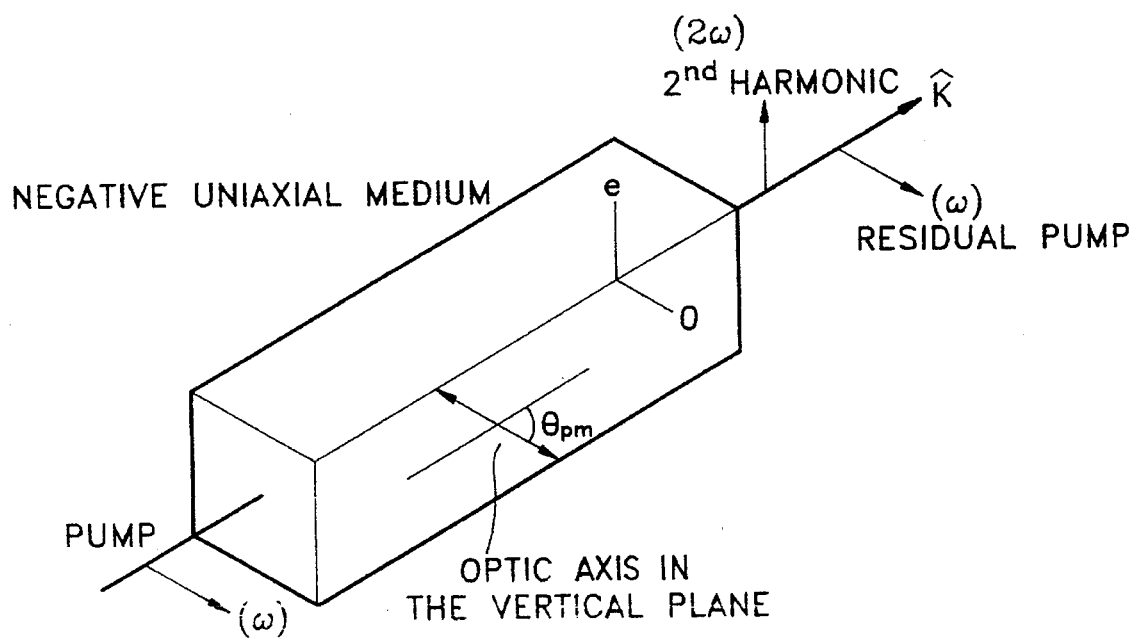
FIG. 1A is a drawing for illustrating type I phase matching in the second harmonic generator in a negative uniaxial medium.

In type I phase matching condition, both the linearly polarized pump and second harmonic wave propagate in the same direction $\hat{K}$ that makes an angle $\theta_{pm}$ (the phase matching angle) with the optical axis. For a negative uniaxial medium, $$n_o^{(2w)} = n_e^{(w)}(\theta_{pm})$$

i. e., the pump beam is an ordinary wave and the second harmonic is an extraordinary wave, both propagating in the direction $\hat{K}$ at the same velocity (phase). The experimental schematic is given in FIG. 1A. The medium is cut so that $\theta_{pm}$ can be easily aligned. For a positive uniaxial medium, $$n_o^{(2w)} = n_e^{(w)}(\theta_{pm})$$

i. e., the pump beam is an extraordinary wave and the second harmonic is an ordinary wave, both propagating in the direction $\hat{K}$ at the same velocity (in phase). The angle $\theta_{pm}$ for a positive uniaxial crystal is given by the following equation.

$$\sin^2\theta_{pm} = \{[n_o^{(2w)}]^{-2} - [n_o^{(w)}]^{-2}\}/\{[n_e^{(w)}]^{-2} - [n_o^{(w)}]^{-2}\}$$

Figure 1B:
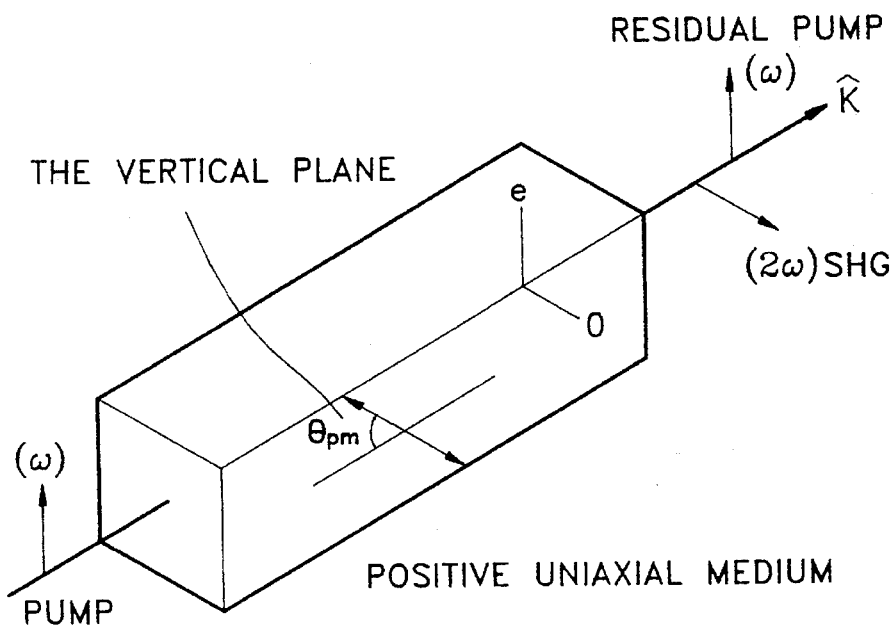
FIG. 1B is a drawing for illustrating type I phase matching in the second harmonic generator in a positive uniaxial medium.

The experimental schematic is shown in FIG. 1B.

In type II phase matching condition, two pump beams with orthogonal linear polarizations are used; one is an ordinary wave, the other is an extraordinary wave. The generated second harmonic is an extraordinary wave. All the waves propagate in the same direction $\hat{K}$ making an angle $\theta_{pm}$ with respective to the optical axis and the following equation has to be satisfied.

$$n_e^{(2w)}(\theta_{pm}) = [n_o^{(w)} + n_e^{(w)}(\theta_{pm})]/2$$

Figure 2:
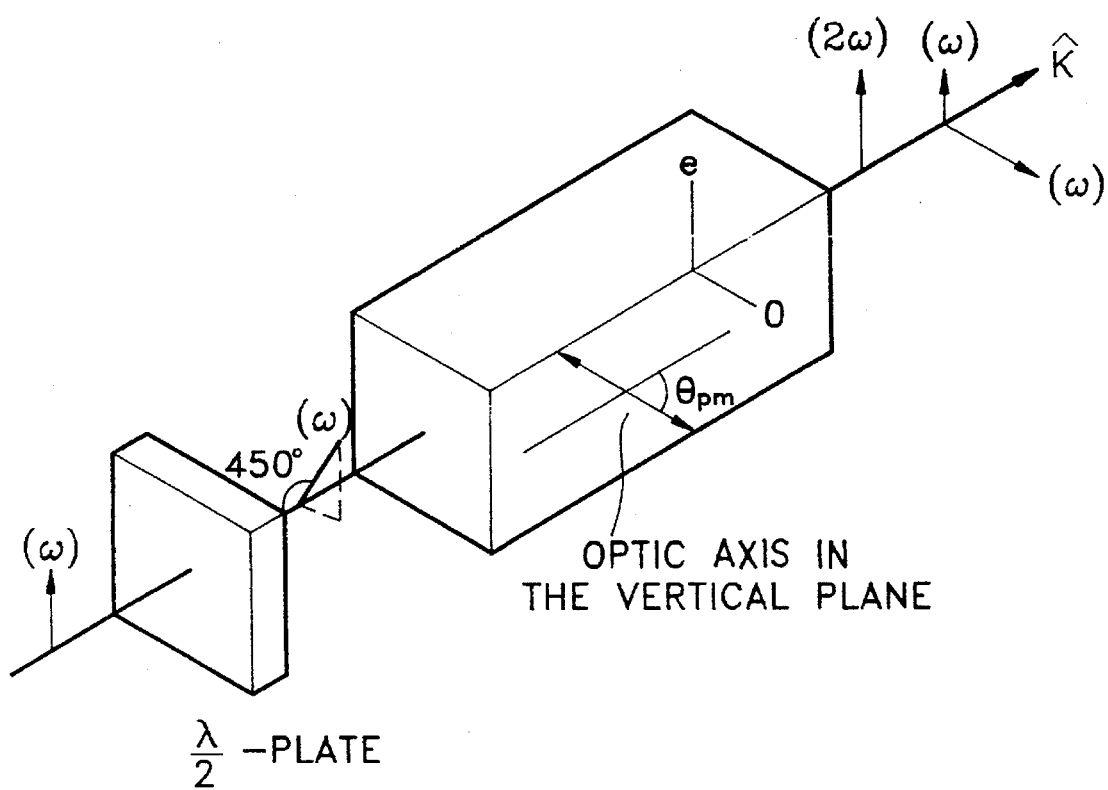
FIG. 2 is a drawing for illustrating one practical method for type II phase matching in the second harmonic generator in a uniaxial crystal.

This means that the "mean" velocity of the combined pump waves is equal to the velocity of the second harmonic wave. FIG. 2 shows one practical way of phase matching starting from one pump beam. The pump beam first passes through a half-wave plate so that the incident linearly (vertically) polarized pump beam becomes polarized at 45° with respect to the vertical axis (e-axis in the crystal). In entering the second harmonic medium, the incident wave is decomposed into the ordinary and extraordinary waves. These two waves, thus, satisfy the condition of two pump beams. The output has three waves, of which two pump waves (here, phase-shifted with each other) and the second harmonic waves are vertically polarized. The two pump waves are combined to form a resultant wave of elliptical polarization, in general.

The fundamental wave is removed from the second harmonic emitted from the resonator by providing a filter in front of the output mirror of the resonator. Also, The second harmonic is divided into two paths by providing a beam splitter on the proceeding path of the second harmonic.

The second harmonic separated by the beam splitter is electrically detected by providing a photo detector on the proceeding path of the second harmonic reflected by the beam splitter, and the photo detector can transfer the detected electric signal to a feedback circuit controlling the thermoelectric cooling element.

When the second harmonic mentioned above is linearly polarized perfectly, there is no problem in temperature control of the frequency doubling non-linear birefringent element, however, in fact, the error quantity of the signal sent to the feedback circuit can be more than 10% according to the degree of disappearance of polarization. Accordingly, another beam splitter is provided in front of the photo detector in order to solve such problems in the present invention.

Figure 3:
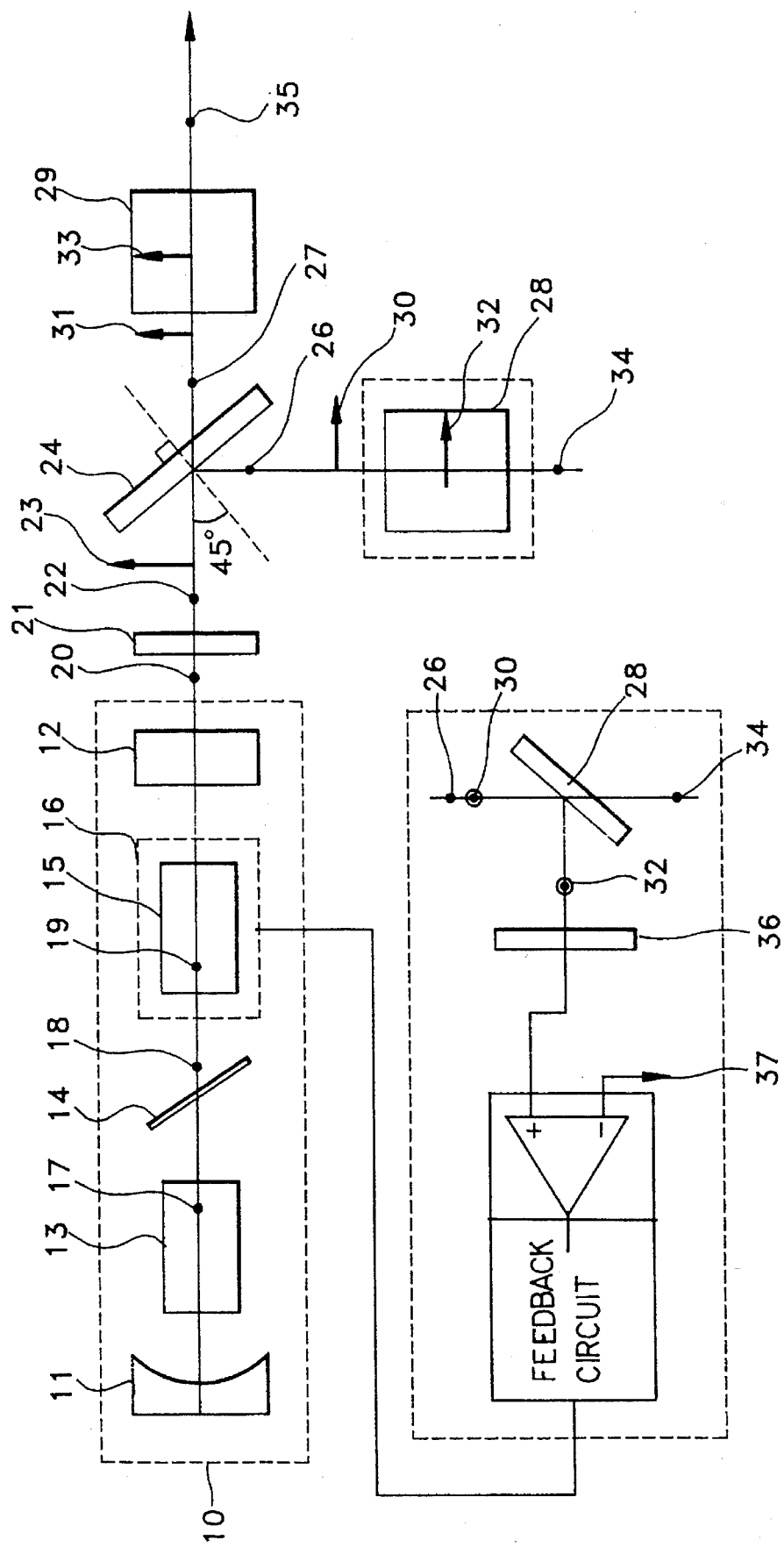
FIG. 3 is a schematic of a second harmonic generation apparatus according to the present invention.

In FIG. 3, reference number 10 denotes a resonator. Resonator 10 includes an input mirror 11 and an output mirror 12 on which coating layers of high reflectivity are provided respectively. A gain medium 13 (e.g., Nd:YAG), a Brewster plate 14 which is a polarization element, and a non-linear birefringent element 15 (e.g., KTiOPO$_4$) are located sequentially on the optical axis located inside the resonator. Non-linear birefringent crystalline element 15 is placed on a Peltier element 16, a thermoelectric cooler, for controlling the temperature.

When input mirror 11 and output mirror 12 of resonator are arranged properly, maximum resonance of the fundamental wave is realized. A pumping laser 17 firing through the input mirror excites gain medium 13, and the fundamental wave is generated from the excited gain medium. The generated fundamental wave is transmitted to Brewster plate 14 and becomes a polarized beam 18. The polarized beam 18 passes through frequency doubling non-linear birefringent element 15 generating a second harmonic 19, and second harmonic 19 is emitted through output mirror 12. At this time, while some of the fundamental wave comes out through the output mirror, most of the fundamental wave is confined inside resonator 10 and resonated. Since some fundamental wave is included in output laser 20, the second harmonic is filtered in filter 21, the beam passing out of filter 21 is a pure second harmonic 22.

In a second harmonic generation apparatus according to the present invention, the type II phase matching method is applied to the frequency doubling non-linear birefringent crystalline element 15 in order to generate the second harmonic. The incident surface of Brewster plate 14 is tilted 45° with respect to the extra-ordinary axis of frequency doubling non-linear birefringent crystalline element 15 in order to match phases.

The polarized light 23 of the second harmonic is generated along the extra-ordinary axis of the frequency doubling birefringent crystalline element.

Second harmonic 22 radiates to a beam splitter 24 tilted 5°, and is divided into two paths. While the incident surface of the beam splitter is not coated, an anti-reflection layer is coated on the emitting surface in order to prevent reflection loss of the second harmonic.

Generally, the reflectivity of the beam splitter is determined by the polarized light of an incident beam. Hereinafter, the polarized light 23 of the output laser of the second harmonic parallel to the incident surface of beam splitter 24 is given as p-polarization, the polarized light in the direction perpendicular to the incident surface is given as s-polarization, and the reflectivities against p-polarized light and s-polarized light are set as $R_\parallel$ and $R_\perp$, respectively.

In the second harmonic generation apparatus of the present invention, a reflecting beam 26 of the second harmonic reflected by beam splitter 24 is used to detect the output change of second harmonic 22, and a transmitting beam 27 becomes the actual output. A second and third beam splitter 28 and 29 different from the first beam splitter are provided on the proceeding path of reflecting beam 26 and that of transmitting beam 27 respectively. Each beam splitter has an incline angle of 45°, and their incident surfaces are perpendicular to the incident surface of the first beam splitter. Polarized light 23 denotes p-polarization with respect to first beam splitter 24, polarized light 30 and 31 denote s-polarization with respect to second beam splitter 28 and third beam splitter 29. Each reflecting beam 32 and 33 of the beam splitter moves in a direction perpendicular to the surface of drawing.

A beam 32 reflected by beam splitter 28 is converted into an electrical signal by a photo detector 36, this signal generates a temperature error signal by comparison with a reference value. When the temperature is maintained uniformly by properly operating the feedback circuit with the temperature error signal, the temperature error signal becomes close to '0', and a final output 35 becomes stabilized.

Figure 4:
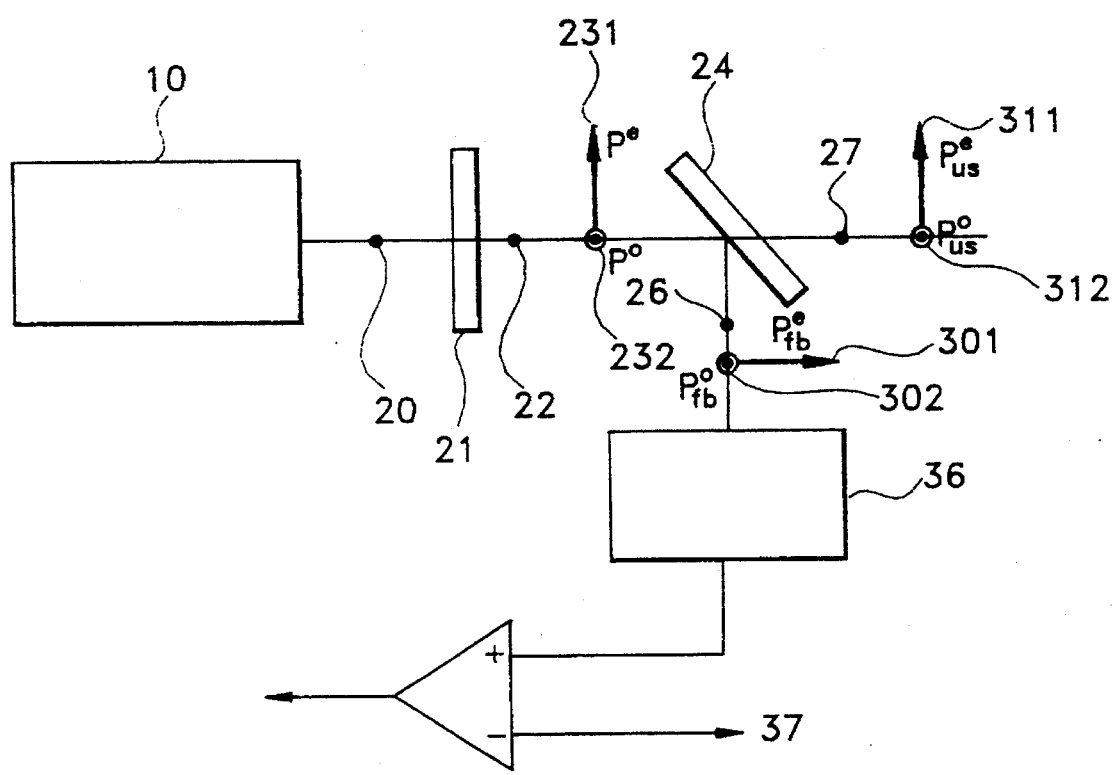
FIG. 4 is an extracted schematic of a conventional feedback control structure for explaining the present invention.

The fact that the degree of disappearance of polarization of the second harmonic by the non-linear birefringent crystalline element depends on the temperature is worth paying attention to. This fact is proved clearly by a simple theoretical consideration. The extracted feedback structure and second output in a conventional second harmonic generation method is shown in FIG. 4 in order to compare the second harmonic generation method of the present invention in theory. Each symbol is used same as the corresponding element of the present invention for the sake of convenience.

In the feedback structure of FIG. 4, the fact that a second harmonic 22 is a beam with no polarized light. The theory is explained in the conventional method with reference to FIG. 4, before the theory of stabilization by the feedback of the present invention is explained. In the conventional method, a major component 231 and minor component 232 exist simultaneously in second harmonic 22, their outputs are set as $P^e$ and $P^o$, respectively. In FIGS. 4, 26 and 27 denote beams transmitted and reflected by first beam splitter 24, they have major components 301 and 311 and minor component 302 and 312, respectively. Accordingly, when the outputs of reflecting beam 26 and transmitting beam 27 are set as $P_{fb}$ and $P_{us}$, respectively, each major component 301 and 311 of reflected beam 26 and transmitted beam 27 have major output components $P_{fb}^e$ and $P_{us}^e$, respectively, and their minor components 302 and 312 have minor output components $P_{fb}^o$ and $P_{us}^o$, respectively The output components can be expressed as:

$$P^e_{fb} = R_\parallel P^e \quad (1)$$

$$P^o_{fb} = R_\perp P^o \quad (2)$$

$$P^e_{us} = (1 - R_\parallel) P^e \quad (3)$$

$$P^o_{us} = (1 - R_\perp) P^o \quad (4)$$

where $P_{fb}^e$, $P_{fb}^o$, $P_{us}^e$, and $P_{us}^o$ denote the outputs in the polarization direction corresponding to 301, 302, 311 and 312. The overall outputs $P_{fb}$ and $P_{us}$ can be expressed as the sum of equations (1) and (2), and (3) and (4), respectively.

An important parameter K can be defined as the ratio of $P_{fb}$ to $P_{us}$ as follows.

$$K = \frac{P_{us}}{P_{fb}} \quad (5\text{-}1)$$

$$= \frac{P^e_{us} + P^o_{us}}{P^e_{fb} + P^o_{fb}} \quad (5\text{-}2)$$

$$= \frac{P^e(1 - R_\parallel) + P^o(1 - R_\perp)}{R_\parallel P^e + R_\perp P^o} \quad (5\text{-}3)$$

Since $P_{fb}$ is the output measured in optical detector 36 in order to generate a normal temperature error signal, $P_{fb}$ should be a constant for temperature control in normal photo detection. If K is a constant, $P_{us}$ should be a constant, too. However, in fact, since K might not be a constant due to the change of the output $P^o$ generated by the disappearance of polarization, $P_{us}$ cannot be a constant, also, which means that the output of the second harmonic can not be stabilized.

Figure 5:
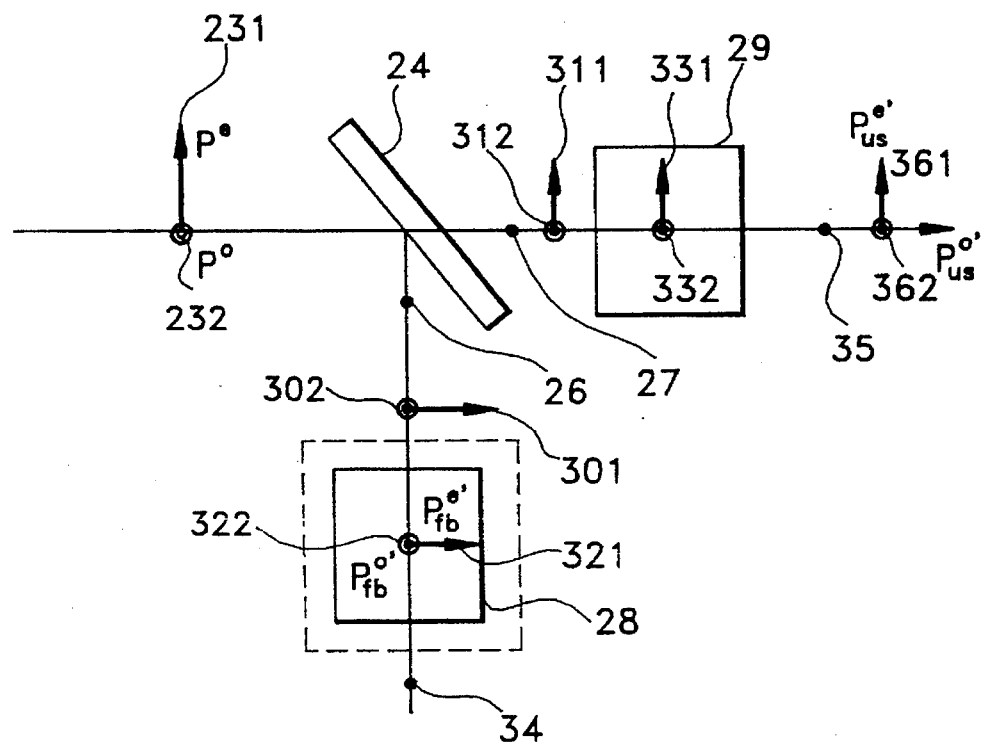
FIG. 5 is an extracted schematic of the feedback control structure of the second harmonic generation apparatus according to the present invention.
Figure 6:
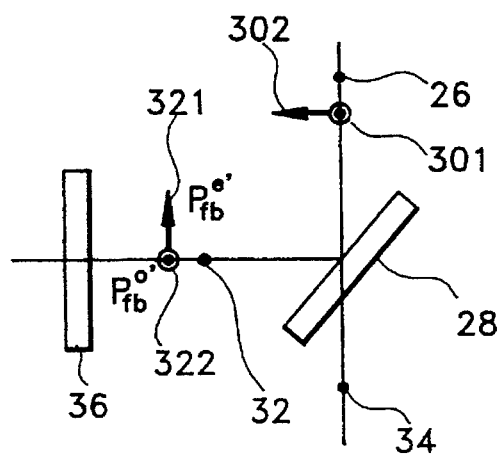
FIG. 6 is an extracted schematic of the path of a second reflecting beam in the feed control structure shown in FIG. 5.

The theoretical second harmonic output and feedback structure of the present invention are as follows. FIG. 5 is a drawing detailing the feedback structure and output of the second harmonic generation apparatus of the present invention shown in FIG. 3. Three beam splitter 24, 28 and 29 are arranged on the proceeding path of the second harmonic. Beam 22 from transmitting filter 21 has major output component 231 and minor output component 232. Reflected beam 26 and transmitted beam 27 generated when beam 22 passes first beam splitter 24 have two polarization direction components denoted as 301 and 302, and 311 and 312, namely, major and minor components, respectively. Beam 34 and 35 are transmitted by second and third beam splitter 28 and 29 respectively. Beam 32 reflected by second beam splitter 28 is used in the feedback circuit, and beam 35 transmitted by third beam splitter 29 is used as the final output. Final output beam 35 and final reflecting beam 32 still have two polarization components, namely, major components 361 and 321 and minor components 362 and 322. Light reflected by third beam splitter 29 has major component 331 and minor component 332. The reflected light is not used and is abandoned.

Here, the output of major component 301 of first reflecting beam 26, the output of minor component 302, the output of major component 321 of second reflecting beam 32, and the output of minor component 322 are defined as $P_{fb}^e$, $P_{fb}^o$, $P_{fb}^{e\prime}$, and $P_{fb}^{o\prime}$, respectively. Also, the output of major component 311 of first transmitting beam 27, the output of minor component 312, the output of major component 361 of second transmitting beam 35, and the output of minor component can be defined as $P_{us}^e$, $P_{us}^o$, $P_{us}^{e\prime}$, and $P_{us}^{o\prime}$, respectively The component of each output can be expressed as the following equations.

$$P_{fb}^{e\prime} = R_\perp R_\parallel P^e \quad (6)$$

$$P_{fb}^{o\prime} = (1 - R_\perp)P_{fb}^o = R_\parallel R_\perp P^o \quad (7)$$

$$\begin{aligned} P_{us}^{e\prime} &= (1-R_\perp)P_{us}^e \\ &= (1-R_\perp)(1-R_\parallel)P^e \end{aligned} \quad (8)$$

$$\begin{aligned} P_{us}^{o\prime} &= (1-R_\parallel)P_{us}^e \\ &= (1-R_\perp)(1-R_\parallel)P^o \end{aligned} \quad (9)$$

The overall output of second reflecting beam 32 and second transmitting beam 35 can be defined as $P_{fb}'$ and $P_{us}'$. Each overall output $P_{fb}'$ and $P_{us}'$ are the sum of equations (6) and (7), and (8) and (9). Parameter K' can be defined as the ratio of $P_{fb}'$ to $P_{us}'$ as below.

$$K' = \frac{P_{us}'}{P_{fb}'} \quad (10\text{-}1)$$

$$= \frac{P_{us}^{e\prime} + P_{us}^{o\prime}}{P_{fb}^{e\prime} + P_{fb}^{o\prime}} \quad (10\text{-}2)$$

$$= \frac{(1-R_\parallel)(1-R_\perp)}{R_\parallel R_\perp} \quad (10\text{-}3)$$

In equation (10-3), K' is a constant which has nothing to do with the disappearance of polarization. Accordingly, as long as $P_{fb}'$ is maintained uniformly in the feedback circuit, $P_{us}'$ is a constant. Consequently, the actual output $P_{us}'$ is always stabilized.

Here, comparing equation (5-3) with equation (10-3), K in the former is the function of $P^e$ and $P^o$ and is not a constant. Therefore, although $P_{fb}$ is maintained uniformly in the feedback circuit, the output $P_{us}$ is not uniform. Equation (10-3) is a resultant equation when other beam splitters are provided on the proceeding path of the reflecting beam and the transmitting beam, K' is not a function of $P^o$ and $P^e$ and is a constant. Namely, since $P_{fb}$ is maintained uniformly in the feedback circuit, the output of the transmitting beam $P_{us}$ is also uniform.

The stabilization of the output is greatly improved by the method of the present invention as above.

What is claimed is:

1. A second harmonic generation apparatus comprising:

a resonator providing an input mirror and an output mirror;

a non-linear birefringent crystalline element and a gain medium provided on an optical axis placed inside the resonator;

a temperature control device controlling the temperature of said non-linear birefringent crystalline element;

a first beam splitter provided on the proceeding path of the second harmonic passed through said output mirror;

an optical detector provided on the proceeding path of a reflecting beam of the second harmonic reflected by said first beam splitter;

a second beam splitter provided in between said optical detector and said first beam splitter;

a third beam splitter provided on the proceeding path of a transmitted beam passed through said first beam splitter; and a control circuit controlling said temperature control device by a signal emitted from said optical detector.

2. A second harmonic generation apparatus according to claim 1, wherein said second beam splitter and third beam splitter have an incline angle with respect to the incident surface of said first beam splitter so that the incident surface of said second and third beam splitter are arranged perpendicular to the incident surface of the first beam splitter, and wherein said second and third beam splitters are arranged to satisfy $$K = \frac{(1-R_\parallel)(1-R_\perp)}{R_\parallel R_\perp}$$

where K is a constant, $R_\parallel$ is reflectivity with respect to p-polarization parallel to the incident surfaces of said first and second beam splitters, and $R_\perp$ is reflectivity with respect to s-polarization perpendicular to the incident surfaces of said first and second beam splitters.

3. A second harmonic generation method comprising the steps of: generating a fundamental wave and a second harmonic thereof inside an optical resonator; separating a second harmonic using a first beam splitter; and feeding back the separated light to control the temperature of the generation source of the second harmonic;

wherein an optical output separated from a second harmonic output is separated using a second beam splitter at a predetermined ratio with respect to an extraordinary axis and an ordinary axis, and the separated light is used as the output for controlling the temperature of the generation source of the second harmonic, wherein the output of the remainder obtained by separating the part of the output of the second harmonic by a third beam splitter at an other ratio with respect to the components of the extra-ordinary axis and the ordinary axis is used as a final output, and wherein said second and third beam splitters are arranged to satisfy $$K = \frac{(1-R_\parallel)(1-R_\perp)}{R_\parallel R_\perp}$$

where K is a constant, $R_\parallel$ is reflectivity with respect to p-polarization parallel to the incident surfaces of said first and second beam splitters, and $R_\perp$ is reflectivity with respect to s-polarization perpendicular to the incident surfaces of said first and second beam splitters.

* * * * *